Patented Jan. 22, 1946

2,393,532

UNITED STATES PATENT OFFICE 2,393,532

CATALYTIC OXIDATION OF KETONES

George W. Hearne, Berkeley, Merrill L. Adams, Lafayette, and Vernon W. Buls, Berkeley, Calif., assignors to Shell Development Company, San Francisco, Calif., a corporation of Delaware No Drawing. Application November 27, 1942, Serial No. 467,274

19 Claims. (Cl. 260—593)

This invention relates to the catalytic oxidation of ketones and more particularly to the production of diketones by the catalytic oxidation of ketones of four or more carbon atoms which are capable of existing in the enol form, more particularly all ketones of four or more carbon atoms having a methylene group directly attached to the carbonyl group. The invention is of particular importance in that it provides a practical and economical method for the production of diacetyl from methyl ethyl ketone.

The process of the invention is executed by contacting a ketone of the character described with an oxide of a heavy metal, either in the presence or absence of molecular oxygen under conditions providing for the formation of a diketone. The preferred catalysts are the oxides of heavy metals which are capable of existing in the form of more than one oxide, e. g. copper, vanadium, tungsten, lead, molybdenum, cobalt, thallium, manganese, iron, chromium, titanium, uranium columbium, tantalum, etc.

As applied to the production of diacetyl from methyl ethyl ketone, the present process is advantageous in that unlike processes previously disclosed it does not give rise to the concomitant formation of ethyl glyoxal.

The process is broadly applicable to the conversion of mono-ketones of four or more carbon atoms which are capable of existing in the enol form. The treated ketone may be acyclic or cyclic, and, if cyclic, it may be an alicyclic, aromatic, or heterocyclic compound. It may or may not contain substituent groups or substituent elements as halogen, which if present may or may not be split off or otherwise affected during the course of the reaction. Among the ketones which may be employed as starting materials are the following: methyl ethyl ketone, methyl propyl ketone, methyl butyl ketone, methyl isobutyl ketone, ethyl propyl ketone, cyclohexanone, methyl benzyl ketone, diethyl ketone, and the like. According to the invention methyl propyl ketone is converted to methyl ethyl glyoxal, methyl butyl ketone to methyl propyl glyoxal, methyl isobutyl ketone to methyl isopropyl glyoxal, ethyl propyl ketone to methyl propyl glyoxal and/or diethyl glyoxal, cyclohexanone to cyclohexanedione-1,2, methyl benzyl ketone to methyl phenyl glyoxal, etc. As indicated by these examples of conversions effectible by the process of the invention, the diketone products are characterized in that the two carbonyl groups stand in vicinal relation to each other.

The heavy metal oxides employed as catalysts in the execution of the process of the invention are preferably impregnated on a suitable carrier as silica gel, silicon carbide porous aggregates, pumice and the like. Impregnation of the metal oxide on the carrier may be carried out, for example, by treating the degassed carrier with a concentrated solution of the nitrate or chloride of the metal or with an ammonium compound comprising the metal. The nitrates and ammonium compounds may be decomposed to the oxides by heating the dried carrier at an appropriate temperature which is usually between about 250 and 400° C. in a slow stream of air, while the chlorides are usually reduced to the free metal with hydrogen and the metal thereafter converted to the oxide with air.

According to a preferred mode of executing the present process, the vapors of the ketone to be oxidized are contacted with the supported metal oxide catalyst in the presence of oxygen or an oxygen-containing gas such as air. The operating temperature is preferably in the range of from about 150° C. to about 450° C., the temperature used depending upon the catalyst, the particular ketone being treated, the rate of throughput or contact time, and the ratio of the ketone to oxygen. It has been determined that unless the temperature is kept under reasonable control, the oxidation may proceed to the formation of carbon dioxide and water at the expense of the desired product. The temperature may be controlled, for example, by diluting the reaction mixture with steam, by operating with an excess of ketone and/or by using a catalyst impregnated on a material which is a good heat conductor. Also a powdered or "dust" catalyst which can be agitated to dissipate the heat of reaction may be employed. The reaction may be conducted at any pressure commensurate with the temperature at which it is desired to operate but usually the reaction is carried out at near atmospheric pressure.

According to another method of executing the process, the vaporized ketone is passed over the metal oxide catalyst in the absence of air or oxygen. The metal oxide catalyst is reduced by the treatment either to a lower oxide or to the free metal which may be subsequently regenerated to an active oxide by contacting it under suitable conditions with air or oxygen. This method like the single stage procedure wherein the vaporized ketone and oxygen or air are passed over the catalyst simultaneously may or may not be operated using steam as a diluent.

The diketone product is isolated from the reaction mixture upon completion of the reaction by any appropriate means, the exact procedure in any given case being naturally determined by the nature and relative amounts of the other reaction products. In some instances it may be reacted out selectively while in other instances several steps are necessary. Where the diketone product is to be utilized for chemical synthesis, extensive purification treatment is often not essential.

In general, any apparatus of the type suitable for carrying out oxidation reactions in vapor phase may be employed in the execution of the process. When operating with a fixed bed catalyst as is preferred, the apparatus may comprise a catalyst packed reaction tube or chamber positioned within a metal block, as an aluminum block, which is provided with appropriate heating and/or cooling elements. The reactor may be brought to the reaction temperature before or after the vapors to be reacted are introduced thereinto. If before, the ketone may be vaporized in the forepart of the tube rather than in a separate vaporizer.

In the application of the process of the invention to the preparation of diacetyl from methyl ethyl ketone, particularly good results have been found to follow from the use of cuprous oxide as the oxidation catalyst although excellent yields are also obtainable using oxides of other heavy metals, particularly oxides of metals which like copper are combinable with oxygen in more than one stoichiometrical ratio.

The process as applied to the conversion of methyl ethyl ketone to diacetyl is most suitably carried out under conditions providing for not substantially more than about 15% nor substantially less than about 5% of the methyl ethyl ketone being oxidized per pass through the reaction zone. Conditions leading to a higher conversion of the methyl ethyl ketone to oxidation products appear to be without benefit as the diacetyl itself is subject to oxidation under such conditions.

Products formed in addition to diacetyl upon oxidation of methyl ethyl ketone according to the invention include acetic acid, carbon dioxide, acetaldehyde, polymers, and carbon monoxide. These are formed in varying proportions depending upon the conditions observed. The diacetyl may be conveniently isolated by first subjecting the crude product, i. e. the reacted mixture, to a flash distillation which separates the water azeotropes of methyl ethyl ketone and diacetyl together with a small amount of acetaldehyde from the aqueous solution containing the acetic acid and polymers. The azeotrope is salted out and the diacetyl subsequently separated from the ketone by careful fractionation, preferably under a reduced pressure of about 200 mm. of mercury to avoid its decomposition. Under optimum conditions less than 10% of the diacetyl polymerizes in working up the products.

Various phases of the invention are illustrated by the following examples:

EXAMPLE I

A mixture consisting by weight of about 9 parts methyl ethyl ketone, 1 part oxygen, and 22 parts water (steam) was passed over a catalyst of cuprous oxide on silicon carbide porous aggregates in a pyrex glass tube 4.4 cm. in diameter and 51 cm. long enclosed within a metal block heated to about 275° C. The mol velocity of the reactants was controlled so that 86.5% of the ketone passed through the tube unchanged. During the course of the reaction, the maximum block temperature was about 325° C. Based on the consumed ketone the yield of diacetyl was nearly 60%.

EXAMPLE II

Various other heavy metal oxides were applied as catalysts in the oxidation of methyl ethyl ketone to diacetyl, the procedure being essentially that of the run of the foregoing example. The results of these runs are given by the following table:

TABLE

*Oxidation of methyl ethyl ketone over various metal oxide catalysts*

| Catalyst [1] | Carrier | Temp., °C. | Yield of diacetyl on consumed ketone |
|---|---|---|---|
| Molybdenum | Pumice | 365 | 48.2 |
| Lead | Si. C | 320 | 59.1 |
| Manganese | Pumice | 289 | 23.5 |
| Vanadium | Si. C | 319 | 51.4 |
| Cobalt | Si. C | 296 | 48.8 |
| Tungsten | Si. C | 342 | 50.0 |

[1] The catalyst was present in the form of an oxide of the metals listed.

EXAMPLE III

A mixture of amyl ketones consisting of about 75% methyl propyl ketone and about 25% diethyl ketone was passed together with air and steam at a temperature of 330° C. to 335° C. over cuprous oxide impregnated on silicon carbide porous aggregates. The weight ratio of the reactants was roughly 2.2 parts ketone, 1.5 parts air, and 2.5 parts steam, while the contact time allowed was such as to result in between about 8% to about 9% of the ketone feed being converted to oxidation products. Based on the consumed ketone the yield of diketone (chiefly methyl ethyl glyoxal) was about 33%.

Methyl isopropyl glyoxal was produced when methyl isobutyl ketone was oxidized under conditions substantially the same as were used for the oxidation of the amyl ketones.

We claim as our invention:

1. A process for the production of diacetyl from methyl ethyl ketone which comprises reacting methyl ethyl ketone with oxygen in the presence of cuprous oxide supported on silicon carbide porous aggregates at a temperature in the range of from about 150° C. to 450° C. and for a period of time providing for not substantially more than about 15% nor substantially less than about 5% of the methyl ethyl ketone being converted to oxidation products.

2. A process for the production of diacetyl from methyl ethyl ketone which comprises reacting methyl ethyl ketone with oxygen in the presence of cuprous oxide under such conditions that not substantially more than about 15% nor substantially less than about 5% of the methyl ethyl ketone is converted to oxidation products, at a temperature of about 275° C. to about 365° C.

3. A process for the production of diacetyl which comprises reacting methyl ethyl ketone with oxygen in the presence of cuprous oxide, at a temperature of about 275° C. to about 365° C.

4. A process for the production of diacetyl from methyl ethyl ketone which comprises reacting methyl ethyl ketone with oxygen in the presence of an oxide of a heavy metal which is capable of existing in the form of more than one oxide under such conditions that not substantially more than about 15% nor substantially less than about 5% of the methyl ethyl ketone is converted to oxidation products, at a temperature of about 275° C. to about 365° C.

5. A process for the production of diacetyl which comprises reacting methyl ethyl ketone with oxygen in the presence of an oxide of a heavy metal which is capable of existing in the form of more than one oxide, at a temperature of about 275° C. to about 365° C.

6. A process for the production of diacetyl which comprises contacting methyl ethyl ketone with an oxide of a heavy metal, at a temperature of about 275° C. to about 365° C.

7. A process for the production of methyl ethyl glyoxal which comprises reacting methyl propyl ketone with oxygen in the presence of an oxide of a heavy metal which is capable of existing in the form of more than one oxide, at a temperature of about 150° C. to about 450° C.

8. A process for the production of methyl ethyl glyoxal which comprises contacting methyl propyl ketone with an oxide of a heavy metal, at a temperature of about 150° C. to about 450° C.

9. A process for the production of methyl isopropyl glyoxal which comprises reacting methyl isobutyl ketone with oxygen in the presence of an oxide of a heavy metal which is capable of existing in the form of more than one oxide, at a temperature of about 150° C. to about 450° C.

10. A process for the production of methyl isopropyl glyoxal which comprises contacting methyl isobutyl ketone with an oxide of a heavy metal, at a temperature of about 150° C. to about 450° C.

11. A process for the production of diketones from mono-ketones which comprises reacting a mono-ketone of four or more carbon atoms having a methylene group directly attached to the carbonyl group with oxygen in the presence of cuprous oxide under such conditions that not substantially more than about 15% nor substantially less than about 5% of the mono-ketone is converted to oxidation products, at a temperature of about 150° to about 450° C.

12. A process for the production of a diketone which comprises reacting a mono-ketone of four or more carbon atoms having a methylene group directly attached to the carbonyl group with oxygen in the presence of cuprous oxide, at a temperature of about 150° C. to about 450° C.

13. A process for the production of a diketone which comprises reacting a mono-ketone of four or more carbon atoms having a methylene group directly attached to the carbonyl group with oxygen in the presence of an oxide of a heavy metal which is capable of existing in the form of more than one oxide, at a temperature of about 150° C. to about 450° C.

14. A process for the production of a diketone which comprises contacting a mono-ketone of four or more carbon atoms having a methylene group directly attached to the carbonyl group with an oxide of a heavy metal, at a temperature of about 150° C. to about 450° C.

15. A process for the production of diacetyl which comprises reacting methyl ethyl ketone with oxygen in the presence of cuprous oxide on silicon carbide porous aggregates at a temperature between about 275° C. and about 365° C.

16. A process for the production of diacetyl which comprises reacting methyl ethyl ketone with oxygen in the presence of cuprous oxide supported on silicon carbide porous aggregates at a temperature of about 275° C. to about 365° C. and for a period of time providing for not substantially more than about 15% nor substantially less than about 5% of the methyl ethyl ketone being converted to the desired oxidation product.

17. A process for the production of methyl ethyl glyoxal which comprises reacting methyl propyl ketone with oxygen in the presence of cuprous oxide at a temperature between about 330° C. and about 335° C.

18. A process for the production of methyl isopropyl glyoxal which comprises reacting methyl isobutyl ketone with oxygen in the presence of cuprous oxide at a temperature between 330° C. and about 335° C.

19. A process for the production of methyl ethyl glyoxal which comprises reacting methyl propyl ketone with oxygen in the presence of cuprous oxide supported on silicon carbide porous aggregates at a temperature of about 330° C. to about 335° C. and for a period of time sufficient to result in about 5% to about 15% of the methyl propyl ketone being converted to oxidation products.

GEORGE W. HEARNE.
MERRILL L. ADAMS.
VERNON W. BULS.